United States Patent
Fickel et al.

(10) Patent No.: US 7,360,368 B2
(45) Date of Patent: Apr. 22, 2008

(54) SYSTEM AND METHOD FOR VAPORIZING A CRYOGENICALLY STORED FUEL

(75) Inventors: Hans Fickel, Moosburg (DE); Andres Groetzbach, Diessen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/434,747

(22) Filed: May 17, 2006

(65) Prior Publication Data
US 2006/0201164 A1    Sep. 14, 2006

Related U.S. Application Data

(63) Continuation of application No. PCT/EP2004/012828, filed on Nov. 12, 2004.

(30) Foreign Application Priority Data
Dec. 11, 2003    (DE)    ................... 103 58 311

(51) Int. Cl.
*F17C 9/02*    (2006.01)
*F25B 19/00*    (2006.01)
(52) U.S. Cl. ............................. 62/50.2; 62/7
(58) Field of Classification Search ......... 62/7, 62/50.2
See application file for complete search history.

(56) References Cited

U.S. PATENT DOCUMENTS 3,552,134 A * 1/1971 Arenson .................. 62/50.2
3,565,201 A * 2/1971 Petsinger ................. 180/69.5
3,823,568 A * 7/1974 Bijasiewicz et al. ......... 62/7

(Continued)

FOREIGN PATENT DOCUMENTS

DE    610518 C    3/1936

(Continued)

OTHER PUBLICATIONS

International Search Report dated Jun. 20, 2005, including an English translation of pertinent portion (Twelve (12) pages).
German Search Report dated Apr. 28, 2004, including an English translation of pertinent portion (Four (4) pages).

*Primary Examiner*—William C Doerrier
(74) *Attorney, Agent, or Firm*—Crowell & Moring LLP

(57) ABSTRACT

A system and method for vaporizing a cryogenically stored fuel, particularly hydrogen, liquefied by cooling below the ambient temperature is provided. A system for vaporizing a cryogenically stored fuel uses heat arising in the area of a fuel consumer, and includes: a withdrawing line device for drawing fuel out of a tank device; a vaporizer device for vaporizing the fuel drawn via the withdrawing line, while introducing the vaporization heat; a gas line device for feeding the vaporized fuel to each consumer; a heat transfer system provided in the vicinity of the consumer while serving to absorb heat arising in the vicinity of the consumer, and; a fuel/heat exchanger device, through which a heat transfer fluid flows and which forms a part of the vaporizer device, for providing the vaporization heat via a heat flux drawn out of the heat transfer system. The coupling of the fuel/heat exchanger device to the heat transfer system is effected via a forward section and a return section such that the throughput of the heat transfer fluid, which is required for introducing the vaporization heat, through the fuel/heat exchanger device can be set in a varying manner by the fluid throughput through the forward section and/or the return section.

35 Claims, 9 Drawing Sheets

U.S. PATENT DOCUMENTS

| | | | |
|---|---|---|---|
| 4,441,326 A * | 4/1984 | Bernauer et al. | 62/7 |
| 4,599,868 A | 7/1986 | Lutjens et al. | |
| 5,147,005 A * | 9/1992 | Haeggstrom | 180/69.5 |
| 5,325,894 A * | 7/1994 | Kooy et al. | 141/4 |
| 5,390,646 A | 2/1995 | Swenson | |
| 5,551,242 A * | 9/1996 | Loesch et al. | 62/50.3 |
| 5,560,212 A * | 10/1996 | Hansen | 62/7 |
| 5,678,410 A * | 10/1997 | Fujita et al. | 62/7 |
| 5,921,090 A * | 7/1999 | Jurewicz et al. | 62/50.2 |
| 6,125,637 A * | 10/2000 | Bingham et al. | 62/7 |
| 6,601,571 B1 * | 8/2003 | Di Gennaro et al. | 123/557 |
| 6,753,105 B2 * | 6/2004 | Fleck et al. | 429/13 |

FOREIGN PATENT DOCUMENTS

| | | |
|---|---|---|
| DE | 39 24776 A1 | 2/1990 |
| DE | 40 25 023 A1 | 2/1992 |
| DE | 195 21 591 A1 | 1/1996 |
| DE | 195 06 486 A1 | 9/1996 |
| DE | 196 16 811 A1 | 11/1996 |
| DE | 102 32 522 A1 | 4/2004 |
| EP | 1 213 464 A2 | 6/2002 |

* cited by examiner

SYSTEM AND METHOD FOR VAPORIZING A CRYOGENICALLY STORED FUEL

CROSS-REFERENCE TO RELATED APPLICATIONS

This application is a continuation of PCT Application No. PCT/EP2004/012828 filed on Nov. 12, 2004, which claims priority to German Application No. 103 58 311.4 filed Dec. 11, 2003, the disclosures of which are incorporated by reference herein.

BACKGROUND AND SUMMARY OF THE INVENTION

The invention relates to a system and a method for vaporizing a cryogenically stored fuel, e.g., hydrogen, liquefied by cooling, in particular below ambient temperature.

Fuels whose critical temperatures are below ordinary ambient temperature may be stored in insulated tank arrays. Such tank arrays, also known as cryotanks, are characterized by a comparatively low inherent weight, but also by an advantageous ratio of installation space to storage capacity.

Tank arrays provided for liquid storage of cooled and liquefied cryofuels are preferably filled with liquid fuel under a predetermined excess pressure. The storage temperature determined by the tank pressure can be maintained by cooling equipment and by vaporizing the fuel. When using such tank systems in motor vehicles, the fuel is usually supplied to the consumer in gaseous form, whereby the gas feed stream required for operation of an internal combustion engine is supplied by regulated input of heat to the fuel, which is initially liquid, generating gaseous fuel in accordance with the heat input.

An aspect of the present invention is to create a system and a method for vaporizing a cryogenically stored fuel, which is characterized by a high inherent safety and offers advantages from the standpoint of control technology.

This aspect is achieved according to this invention by a system for vaporizing a cryogenically stored fuel by using heat generated in the area of a fuel consumer, comprising: a withdrawing line device for drawing fuel out of a tank device; a vaporizing device for vaporizing fuel withdrawn via the withdrawing line, yielding heat of vaporization; a gas line device for feeding vaporized fuel to each consumer; a heat transfer system provided in the area of the consumer to take up heat generated in the area of the consumer; and a fuel-heat exchanger device through which a heat transfer fluid flows and which forms part of the vaporizing device for supplying the heat of vaporization through a heat flow withdrawn from the heat transfer system on the consumer end, whereby the coupling of the fuel-heat exchanger device to the heat transfer system on the consumer end is accomplished via a forward flow section and a return flow section such that the throughput of the heat transfer fluid required to introduce the heat of vaporization through the fuel-heat exchanger device may be adjusted by the fluid throughput through the forward flow section and/or the return flow section.

Thus, especially in the case of a consumer designed as an internal combustion engine or as a fluid-cooled fuel cell, it is possible to adjust the heat flow to be supplied to it to vaporize the fuel in a manner that better takes into account the instantaneous operating state of the consumer.

Through the inventive concept solving this problem, it is also contemplated to utilize the refrigeration potential of the fuel for other cooling purposes. On the basis of the inventive concept, it is also contemplated, in particular, to divert, optionally on the consumer end, any excess waste heat in an advantageous manner from the standpoint of equipment technology with small-scale waste heat exchangers having a high temperature gradient.

According to a particularly preferred embodiment of the present invention, the coupling of the fuel-heat exchanger device to the heat transfer system provided in the area of the consumer is accomplished by including an intermediate heat exchanger. This makes it possible in an advantageous manner to design the heat transfer circuit on the consumer end and the heat transfer circuit on the vaporizer end in such a way that they are separated from one another hydraulically. By separating the fluid circuits, it is also possible in particular to fill these fluid circuits with different heat transfer fluids. The fluids provided for filling the respective heat transfer circuit may be adjusted in an advantageous manner to the temperature level in question for the respective heat transfer and to the design properties of the respective fluid paths. In particular, it is possible to fill the fluid circuit on the vaporizer end with a fluid that is stable at low temperatures.

As an alternative to coupling the heat transfer circuit on the vaporizer end to the heat transfer circuit on the consumer end with an intermediate heat exchanger in between—or in a combination of these measures—it is also possible to accomplish the coupling by including a line bridge, which permits recycling of a heat transfer fluid stream flowing out of the heat exchanger device to the input side of the fuel-heat exchanger device. In this way it is possible, in particular, to implement a permanent circulation adjusted with regard to volume flow, of the heat exchanger fluid on the consumer end through the fuel-heat exchanger device. Taking into account the vaporization output required instantaneously, the quantity of heat may be adjusted by regulated supply of a heat transfer fluid substream from the heat transfer system on the consumer end to the heat transfer system on the vaporizer end.

The coupling of the heat transfer system on the consumer end and the heat transfer system on the vaporizer end may also be accomplished by including a bypass line device to create a fluid connection between the forward flow section and the return flow section, bypassing the fuel-heat exchanger device. By way of this bypass line device, it will also be possible to coordinate the heat input from the area at the consumer end into the area at the vaporizer end to the required vaporizer output.

According to an especially preferred embodiment of the present invention, an input temperature detecting sensor is provided for detecting the input temperature of the heat transfer fluid at the input of the fuel-heat exchanger device. The input temperature of the heat transfer fluid, which can be detected in this way, may be taken into account in determining the fluid flow passing through the fuel-heat exchanger device.

In combination with the measure described above, an output temperature detecting sensor is preferably provided in the area of the fuel-heat exchanger device to detect the output temperature of the heat transfer fluid at the output of the fuel-heat exchanger device. By detecting the temperature gradient established via the fuel-heat exchanger device and preferably also detecting the absolute temperatures, it is possible to adjust the heating power input through the volume flow passing through the fuel-heat exchanger device so that the output temperature of the fuel vaporized in the vaporizer device shows minor deviations from a predetermined setpoint.

For delivering the heat transfer fluid through the fuel-heat exchanger device, according to an especially preferred embodiment of the present invention, a pumping device is provided, whereby the delivery output of this pumping device may preferably be adjusted according to the vaporizer output required instantaneously or also taking into account other operating parameters, in particular of the consumer.

According to another especially preferred embodiment of the present invention, final control elements, in particular valves, are provided for adjusting the flow conditions through the fuel-heat exchanger device and preferably also through any connecting line sections between the forward flow section and the return flow section of the heat transfer system on the consumer end. Such final control elements, in particular valves, may be provided, in particular, for adjusting the flow conditions through the bypass or bridging line.

In an advantageous manner, a control device is provided for adjusting the fluid throughput through the forward flow section and the return flow section and/or the fuel-heat exchanger device so as to yield advantageously coordinated system settings from the standpoint of the instantaneous operating state of the consumer. In the case of a hydrogen-operated combustion engine, it is thus possible, in particular, to select other parameters during the warm-up phase for the adjustment of the fluid flows than for the adjustment of the fluid flows after conclusion of the warm-up phase, for example. The fluid flows may also be adjusted by taking into account the ambient temperature in particular. The control unit preferably includes a programmable computer device. As an alterative to this or in combination with such a control unit, the coordination of fluid flows may also be accomplished through self-regulating elements such as wax thermostatic valves, so that regardless of the computer-assisted system control, the system will be adequately stable and, in particular, cannot enter an inadmissible state.

According to an especially preferred embodiment of the invention, the fuel-heat exchanger device is operated in such a way that a cooling potential for the engine and/or the consumer and/or subsystems that are to be cooled at least in phases is available through the heat transfer fluid flow which flows out at the output end. Such a system may be, for example, an exhaust gas recycling system or a charging air cooling system and/or a vehicle air-conditioning system and/or a transmission cooling system, as well as an air drying system for drying the intake air.

The diversion of the heat transfer fluid from the area at the consumer end preferably takes place at a point in the system which provides a sufficiently high temperature level for applying the required heating power. To ensure an adequate vaporization capacity, especially during a cold start phase, the heat transfer fluid is preferably withdrawn from a fast-heating and/or high-temperature section of the heat transfer system on the consumer end. Withdrawing the heat transfer medium at a high-temperature level permits especially high control dynamics in vaporization of the fuel.

However, it is also possible to withdraw the heat transfer medium which permits heat transfer from the system of the consumer at a point in the system where the heat transfer medium is available at a sufficiently high temperature level. This achieves the result that, first of all, heat transfer medium flowing back through the return flow section will have a high cooling potential, while on the other hand it is also possible through this approach to draw additional exhaust heat away from the consumer, which may optionally be necessary (at a high temperature level and thus with a high temperature gradient with respect to the environment—and therefore using compact heat exchangers). It is also possible to provide valve mechanisms by which the most advantageous diversion of the heat transfer fluid in each case can be controlled as a function of temperature or as a function of other operating parameters of the consumer.

The heat transfer fluid stream, which is cooled due to the heat withdrawn from the fuel-heat exchanger device flows back through the return flow section and into the fluid circuit at the consumer end can be fed into the inlet area of the cooling-water heat exchanger according to an especially preferred embodiment of this invention. This may be done so that a temperature level determined by the mixing of the fluid streams prevails at the cooling heat exchanger and the return flow can be coordinated on the whole via a downstream thermostatic valve mechanism. As an alternative to this, however, it is also possible to feed the return flow back into the cooling fluid stream downstream from a cooling-water heat exchanger. This makes it possible to divert excess waste heat and maintain a high temperature level at the input to the cooling-water heat exchanger.

The inventive heat transfer system is suitable in particular for operation of a hydrogen-operated combustion engine. As an alternative to this or in combination with it, it is also possible to supply gaseous hydrogen to a fuel cell system through the inventive heat transfer system.

The heat transfer system on the consumer end preferably forms a part of a coolant circuit of the consumer. In the case of the embodiment of the consumer as an internal combustion engine, it is possible in an advantageous manner to carry the cooled fluid stream flowing back through an exhaust gas recycling system in particular so that cooling of exhaust gas, which is recycled in certain operating phases of the engine, may be performed in the area of the exhaust gas recycling system as needed.

It is also possible to design the heat transfer system on the consumer end so that it comprises a lubricant circuit, e.g., the engine oil circuit or also transmission components. Flow through the fuel-heat exchanger device preferably takes place according to the counter-current principle so that a low return flow temperature of the heat transfer fluid prevails at the outlet end. However, it is also possible to arrange the fuel-heat exchanger device in such a way that the heat transfer takes place according to the co-current system. The heat transfer output of the fuel-heat exchanger device may also be adjusted by operating it selectively according to the co-current or counter-current principle.

Fuel may also be withdrawn from the fuel tank in such a way that the fuel enters the heat exchanger while in a liquid state. The fuel-heat exchanger device is preferably designed so that any build up of ice there cannot cause complete blockage of the fluid pathways.

It is possible to control the inflow of fuel to the vaporizer device by a metering device, in particular a pumping device. It is possible to cycle the fuel flow into the vaporizer.

Aspects of the invention are also achieved by a method for vaporizing a cryogenically stored fuel, in particular hydrogen, in which the fuel is drawn off from a tank device and heated and vaporized by a vaporizer device comprising a heat exchanger, during which process the heat flow required for continuous vaporization of fuel is withdrawn via a thermostatically regulated heat transfer fluid stream withdrawn from a heat transfer system provided on the consumer end, whereby the fluid stream withdrawn from the heat transfer system on the consumer end and a heat transfer fluid stream passed through the vaporizer device are adjusted at different levels at least in certain phases as a function of the operating state of the consumer.

This method is based on the principle of adjusting the heat input into the fuel via the mass flow of a heat transfer fluid which deviates in at least some phases from the mass flow prompted for withdrawal of heat from the consumer. This separation of the mass flows may be accomplished according to this invention on the basis of three different principles, whereby these principles are also used in combination. These principles include the intermediate heat exchange principle, the recirculation heat exchanger principle, and the bridging principle. The intermediate heat exchange principle and the recirculation heat exchange principle make it possible to adjust a mass flow of the heat transfer fluid in the fuel-heat exchanger, the mass flow being greater than the mass flow required to withdraw the necessary quantity of heat from the mass flow of heat transfer fluid from the consumer.

Other objects, advantages and novel features of the present invention will become apparent from the following detailed description of the invention when considered in conjunction with the accompanying drawings.

BRIEF DESCRIPTION OF THE DRAWINGS

FIG. 3 shows an overall diagram of a circulating system for a heat transfer medium for a liquid-cooled combustion engine with a vaporization system according to FIG. 2a;

DETAILED DESCRIPTION OF THE DRAWINGS

Figure 1:
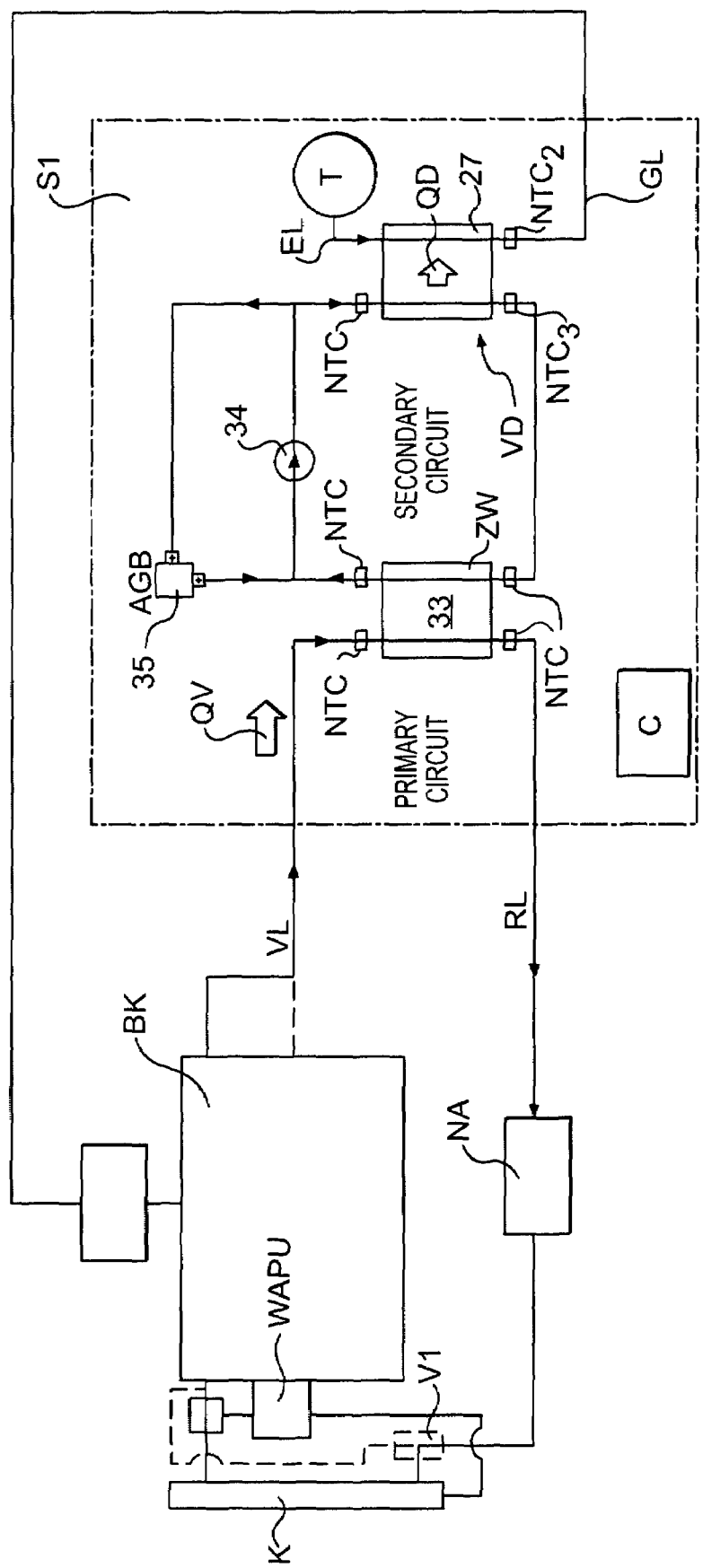
FIG. 1 shows a simplified schematic diagram of a first variant of a coolant circuit for a hydrogen-operated combustion engine in which an intermediate heat exchanger is provided, permitting separation between a fluid circuit on the consumer end and a fluid circuit on the vaporizer end.

FIG. 1 shows in the form of a schematic diagram a system S1 for vaporizing a fuel stored cryogenically in a fuel tank T by using heat generated in the area of a fuel consumer designed here as combustion engine BK.

The system S1 includes a withdrawing line device EL for diverting fuel from the fuel tank T, a vaporizer device VD for vaporizing and thermostatically regulating the fuel, optionally in liquid form, withdrawn through the withdrawing line EL, introducing the heat of vaporization QD, a gas line device GL for supplying the vaporized fuel to the consumer BK, sections of a heat transfer system provided in the area of the consumer BK to absorb heat generated in the area of the consumer, and a fuel-heat exchanger device 27 through which a heat transfer fluid flows, forming part of the vaporizer device VD for supplying the heat of vaporization stream QD through a heat stream QV withdrawn from the heat transfer system.

This system is characterized in that the coupling of the vaporizer device VD with the heat transfer system on the consumer end is accomplished by a forward flow section VL and a return flow section RL in such a way that the throughput of the heat transfer fluid through the fuel-heat exchanger device 27, which is required to introduce the heat of vaporization QD, is adjustable in deviation from the fluid throughput through the forward flow section VL and/or the return flow section RL.

In the exemplary embodiment shown here, the thermal coupling of the fuel-heat exchanger device 27 with the heat transfer system on the consumer end is accomplished through the inclusion of an intermediate heat exchanger ZW. Through the coupling of the fuel-heat exchanger device 27 performed in this way a separation of the fluid circuits into one primary circuit and at least one secondary circuit is achieved. In both of the separate fluid circuits, different heat transfer fluids may be accommodated, each adjusted to the critical temperature range.

In the area of the vaporizer device VD, an input temperature detection sensor NTC1 is provided for detecting the input temperature of the heat transfer fluid at the inlet to the fuel-heat exchanger device 27. For detecting the output temperature of the vaporized fuel at the output of the vaporizer VD, a fuel output temperature detecting sensor NTC2 is provided at the output of the vaporizer VD. In addition, an output temperature detecting sensor NTC3 is also provided for detecting the output temperature of the heat transfer fluid at the outlet of the vaporizer VD.

On the basis of the temperatures detected by the temperature detecting sensors, it is possible to adjust the mass flow of the heat transfer fluid of the secondary circuit so that an input heat flow QD results in the area of the vaporizer VD such that it takes into account the vaporization capacity required at the moment.

The fluid throughput is preferably adjusted by a pump 34. The pump 34 may be designed as a pump that is controllable with regard to the delivery rate. It is also possible to provide final control elements in the secondary circuit by which the fluid throughput in the secondary circuit is adjustable when using a pump with a constant delivery rate. Such final control elements may be designed as thermostatic valves.

The heat transfer from the primary circuit to the secondary circuit is also detected by further temperature-detecting sensors NTC. Throughput through the intermediate heat exchanger on the primary circuit end may be accomplished under the influence of a pressure gradient generated by a water pump WAPU provided in the area of the consumer.

The coupling of the system S1 to the other heat transfer system on the consumer end is accomplished via the forward flow line section VL and the return flow line section RL. The cooling potential of the heat transfer fluid flowing back over the return flow line section RL may be used to cool secondary equipment NA. This may be a heat exchanger for an exhaust gas recycling system, an air drying device, transmission components, electric secondary equipment, as well as heat exchangers of a vehicle air-conditioning system. Operation of the system S1 may be adjusted so as to achieve the required return flow temperature.

The system is adjusted, preferably using an electronic control unit C, so that a heat flow that takes into account the required vaporization power is introduced into the fuel in the vaporizer VD. This control unit C preferably has access to data regarding the instantaneous operating state of the consumer BK including the temperatures of the heat transfer fluid in the respective system sections. On the basis of this data, operation of the system can be coordinated on the basis of several criteria such as the reserve capacity, system efficiency, safety margin, etc.

The secondary circuit, which is separate from the fluid circuit of the consumer BK in this embodiment, is filled with a heat transfer fluid that is stable at low temperatures. The secondary circuit has its own equalizing container AGB and its own degassing system. The degassing system is designed so that any gases penetrating into the secondary circuit are withdrawn and catalytically oxidized, if necessary. The system pressure in the secondary circuit can be adjusted at a level which is higher than the pressure of the vaporized fuel, so that in the case of any leakage, no fuel can penetrate into the secondary circuit. As an alternative to this, it is also possible to select the pressure in the secondary circuit so it is low enough that it is below the pressure in the primary circuit. This prevents a transfer of ignitable gases into the primary circuit.

The intermediate heat exchanger ZW may be designed as a system interface which permits a simple modular coupling of a vaporizer or, in particular, a tank system with an integrated vaporizer. The control unit C may be integrated as a sub-unit into the tank system or may also be provided by the engine management of the consumer BK.

The return feed of the fluid flowing back through the return flow line section RL into the heat transfer system may take place downstream from a cooling-water heat exchanger K or, as also indicated by dotted line, upstream from the cooling-water heat exchanger K. It is possible for the line system to be designed so that both return flow variants are possible, where the corresponding fluid management can preferably be adjusted by valve control. The valve mechanism V1 provided for this purpose may be designed in such a way that it can also initiate mixed states, i.e., a substream input downstream from the radiator K and a substream input upstream from the radiator K. The switch state of the valve mechanism V1 may be defined as a function of selected engine operating parameters, in particular the return flow temperature of the radiator.

Figure 2A:
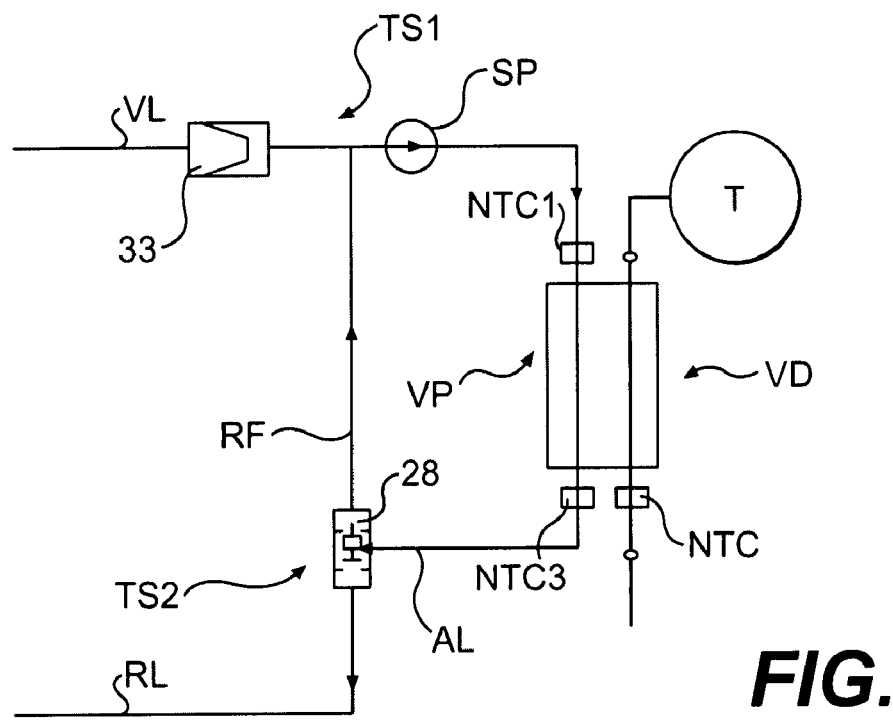
FIG. 2a shows a schematic diagram to illustrate a second inventive variant having a bypass valve-controlled recirculation line, which permits recirculation of a substream of a heat transfer fluid flowing out of a hydrogen vaporizer to the input area of the vaporizer.

FIG. 2a shows a second variant of the inventive vaporization system in which the heat transfer fluid flowing out of the area of the consumer through the forward flow line VL can go through a filter device 33 to a branch point TS1 and through a secondary circulating pump SP into the vaporizer device VD. The heat transfer fluid flowing through the vaporizer device is drawn off through an outflow line AL which opens into a branch point TS2. The branch point TS2 supplies an outlet opening into the return flow line section RL and an outlet opening into a return flow line section RF.

In the area of the branch point TS2, a valve mechanism 28 is provided, making it possible to define the division of the heat transfer fluid stream flowing through the outlet line AL to the return flow line section RL and the return flow line section RF.

The valve 28 may be designed as a valve controlled according to an external control unit or, in particular, as a valve that is automatically regulated as a function of temperature. The circuit design illustrated here achieves the result that essentially only a fluid quantity corresponding to the volume flow set by the valve 28 and flowing out into the return flow line section RL can enter into the secondary circuit formed by including the return flow line section RF through the forward flow line section VL. Regardless of the outflow volume flow defined by the valve 28, a desired throughput of the heat transfer fluid through the vaporizer device VD can be established via the secondary circulating pump SP.

The branch point TS1 in this embodiment forms a mixing point where the heat transfer fluid recycled via the return line section RF comes in contact with the fluid stream flowing through the forward flow lines section VL. Fluid temperatures which are far below the temperature of the heat transfer fluid flowing through the forward flow line section VL can be set in the secondary circuit formed by including the return flow line section RF. This reduces the thermal and structural mechanical burden on the heat exchange areas of the vaporizer device VD. By detecting the inlet and outlet temperatures of the heat transfer fluid on the vaporizer device based on the input and output temperature detecting sensors NTC1 and NTC3, the heat exchange capacity of the vaporizer device VD may be adjusted with high control dynamics via the secondary circulating pump SP.

Figure 2B:
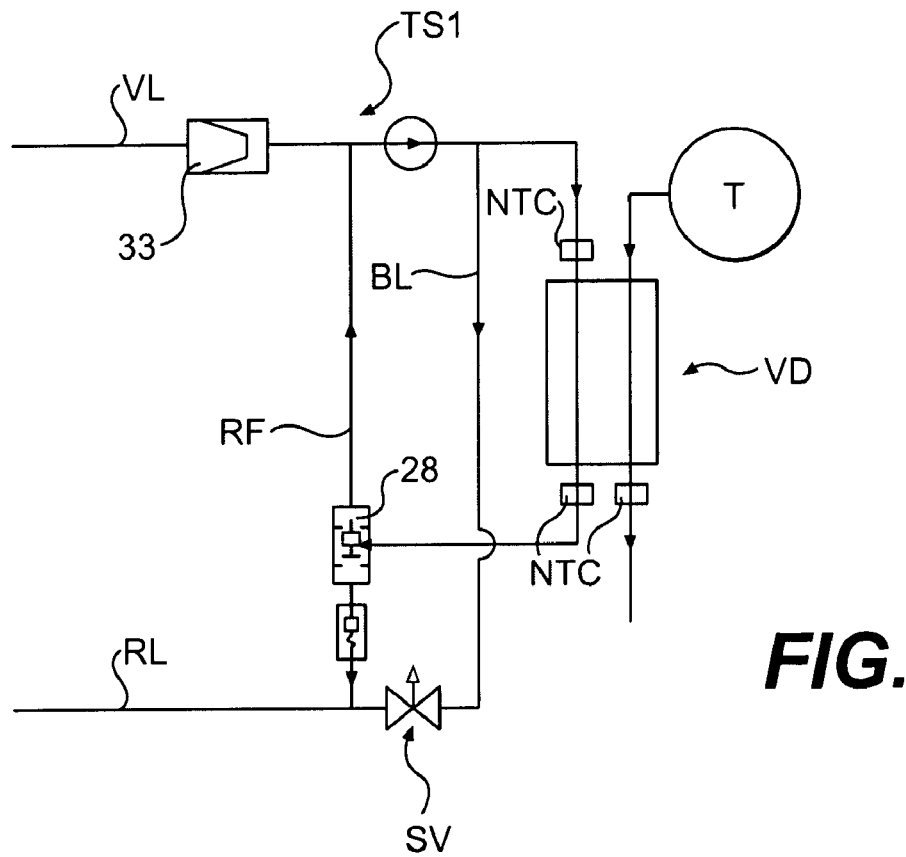
FIG. 2b shows a schematic diagram to illustrate a third inventive variant, likewise with a bypass valve-controlled recirculation line and additional bypass line activatable by valve control.

FIG. 2b shows an embodiment of the heat exchanger system which corresponds in its design essentially to the embodiment described above according to FIG. 2a, but in addition is expanded by including a bypass line BL. Through the bypass line BL it is possible to bridge the vaporizer device VD in the area of the secondary circuit formed by including the return flow line section RF. The bypass line BL is coupled to the return flow line section RL. Via a control valve SV through the tie-in of the bypass line BL presented in this way, it is possible to have an additional effect on the mixing ratio of the volume flows which are combined via the forward flow line section VL and return flow line section RF at the branch point TS1 by way of the control valve SV. As a result of this measure, the temperature of the heat transfer fluid circulated within the secondary circuit can be coordinated with the required vaporizer power with a further increase in control dynamics and also made available to an installed gas recycling device.

Figure 2C:
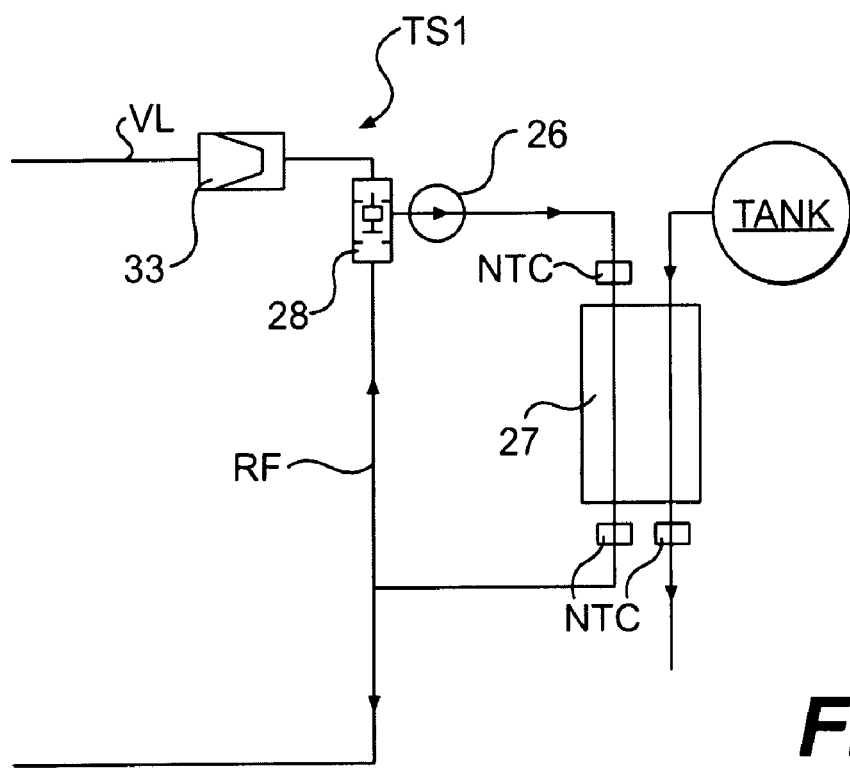
FIG. 2c shows a schematic diagram to illustrate a fourth inventive variant with a forward flow valve-controlled recirculation line.

FIG. 2c shows a fourth variant of the inventive heat transfer system in which the valve 28 is now provided at the branch point TS1. In particular, the inflow of the heat transfer fluid supplied through the forward flow line section VL into the secondary circuit formed by including the return flow line section RF can be controlled by use of the valve 28.

Figure 2D:
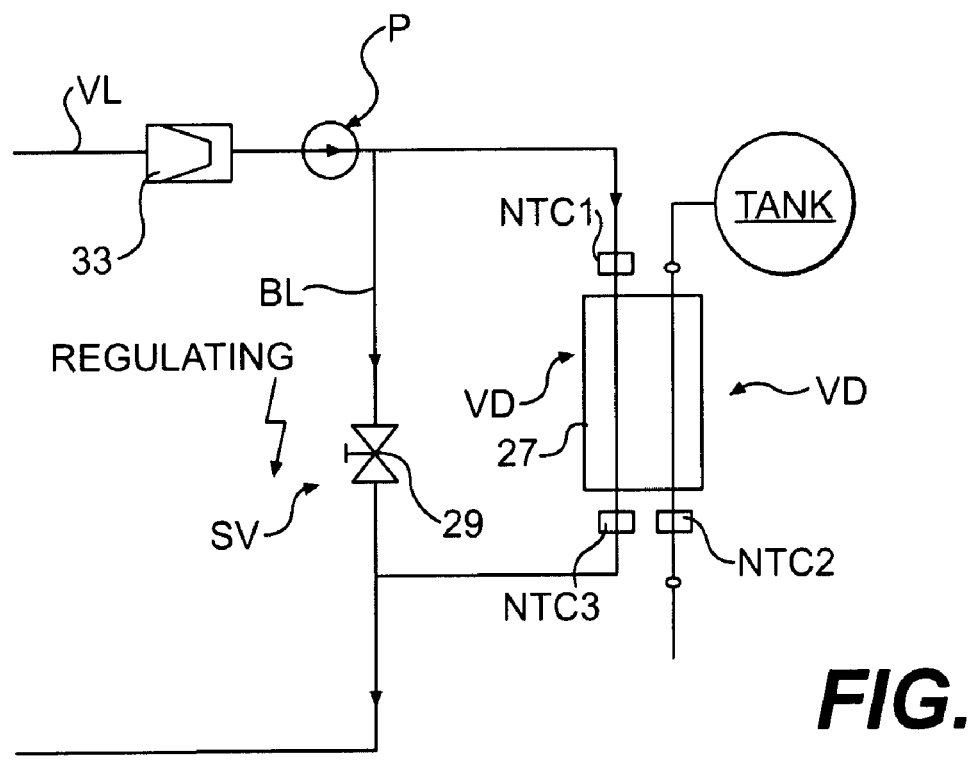
FIG. 2d shows a schematic diagram to illustrate a fifth inventive variant with a valve-controlled bypass line (system according to FIG. 2b, but without the recirculation line)

FIG. 2d shows a fifth variant in which an adjustment of the heat transfer fluid volume flow passing through the vaporizer device VD, which deviates from the inflow through the forward flow line section VL, can be achieved by use of a bypass line BL which bridges the vaporizer device and is equipped with a control valve SV. The system design illustrated here allows the pump P to be operated without control and allows adjustment of the division of the fluid streams flowing out through the vapor device VD and the bypass line BL according to the ratio of the flow resistances of the two fluid path sections. The flow resistance of the bypass line section BL may be variably adjusted here in a predetermined range via the control valve SV. The triggering of the control valve SV can be controlled via a control unit in accordance with the vaporizer performance required instantaneously and the signals detected by the temperature detection sensors NTC1, NTC2 and NTC3.

Figure 3:
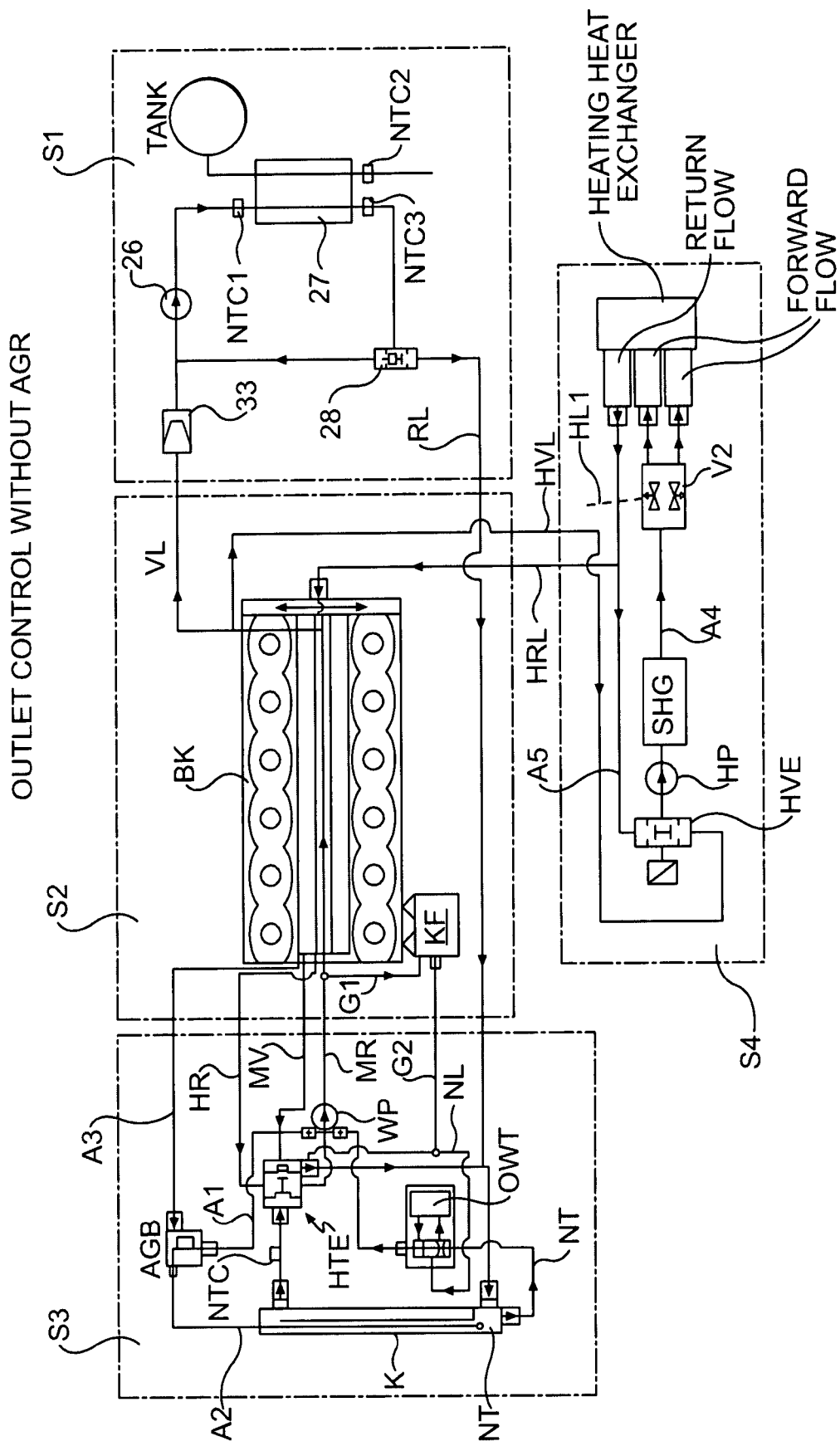

FIG. 3 shows a concrete application of the heat transfer system described above in conjunction with FIG. 2a for generating gaseous hydrogen for a hydrogen-operated internal combustion engine BK of a motor vehicle. For the vaporizer system depicted here, the discussion of FIG. 2a also applies accordingly. The forward flow line section VL is connected to a water coolant system provided in the combustion engine BK. The branch point of the forward flow line section VL is selected so that as soon as possible after starting operation of the combustion engine, the heat transfer fluid (here the engine coolant water) is available at a high temperature level via the forward flow line section. The return flow line section RL is connected to the heat transfer circuit on the consumer end according to a special aspect of the present invention such that fluid flowing back over the return flow line section RL can be fed into the low temperature area of the heat transfer circuit on the consumer end. In this embodiment, the return flow line section is connected to a line section leading to the low temperature area of the vehicle radiator K so that the return flow of the heat transfer fluid through the return flow line section RL is accomplished against a low counterpressure which is not excessively influenced by the engine rotational speed.

The coolant circuit system shown here can be subdivided into four subsystems S1, S2, S3, S4. The subsystem S1 corresponds in design to the system described above in conjunction with FIG. 2a. Subsystem S2 is the heat transfer system designed here as an internal combustion engine BK for receiving the heat generated by the consumer. System S3 is a waste heat system for diverting heat generated in excess to the environment through a cooling-water heat exchanger K and a transmission oil cooling system. Subsystem S4 forms a comfort heating system for heating the passenger compartment of the motor vehicle.

Subsystem S1 is connected to subsystem S2 via the forward flow line section VL and the return flow line section RL. Subsystem S2 communicates with subsystem S3 via an engine forward flow line MV and an engine return flow line MR. The line section HR shown here is a heating return flow line which passes through the engine block area of the combustion engine but does not communicate directly with the coolant channels on the block end. In the area of subsystem S2, a water-cooled generator KF, which is also provided is tied into the coolant circuit via lines G1, G2.

The waste heat system S3 includes the cooling-water heat exchanger K, a mechanical water pump WP, a thermostatic device HTE, a coolant water equalizing tank AGB and an oil heat exchanger ÖWT. The coolant water equalizing tank AGB is connected via a connecting line A2 to the forward flow area of the water pump WP. The equalizing tank is also connected via vent lines A2, A3 to the radiator K and/or to the cooling channels on the cylinder head end of combustion engine BK. The thermostatic device HTE makes it possible to combine and further convey the fluid flows coming in through the line sections HR and MV as a function of temperature and send them to radiator K or directly to the forward flow area of the water pump WP. In the area of the oil heat exchanger ÖWT, a control cartridge is provided through which the fluid throughput through the low temperature return flow NT as well as a secondary line NL is adjustable as a function of temperature.

Subsystem S4 is tied into the heat transfer circuit via a heating forward flow line HVL and a heating return flow line HRL. Heating system S4 comprises a heating heat exchanger having a plurality of heat exchanger sections triggerable via separate forward flow sections. Heating system S4 also comprises a stationary heating system SHG for selective heating of the fluid stream flowing toward the heating heat exchanger through a line section A4, the fluid stream being conveyed by an auxiliary pump HP if necessary.

A heating valve mechanism HVE through which the heating forward flow line HVL can be blocked and the input of the auxiliary pump HP can be connected to the return flow of the heating heat exchanger HP via a bridging line A5 is provided in the area of system S4.

According to a special aspect of the present invention, it is possible to connect subsystem S4, which is equipped with a stationary heating unit to subsystem S1, i.e., the hydrogen vaporization device, in such a way that heat can also be supplied selectively via the stationary heating system SHG. Merely for example, an auxiliary line device HL1 is indicated here with dotted lines; a withdrawal of fluid downstream from the stationary heating system SHG can take place through this auxiliary line device. The auxiliary line device HL1 can be connected by a valve V2. It is also possible to provide a return flow line (not shown) through which a fluid return flow from system S1 is made possible, bypassing systems S2, S3 ("small parallel heating circuit").

In the area of system S1, in particular in the heat exchanger zone between temperature sensors NTC1, NTC2, it is possible to provide a deicing heating device capable of breaking up any ice formed in the area of the heat exchanger. The deicing device may be designed as an electric resistance heater in particular. During a cold start phase of the consumer, it is possible in particular to switch on the deicing heating device and, if necessary also the stationary heating device so that an additional heat input is achieved through these heating devices.

Figure 4:
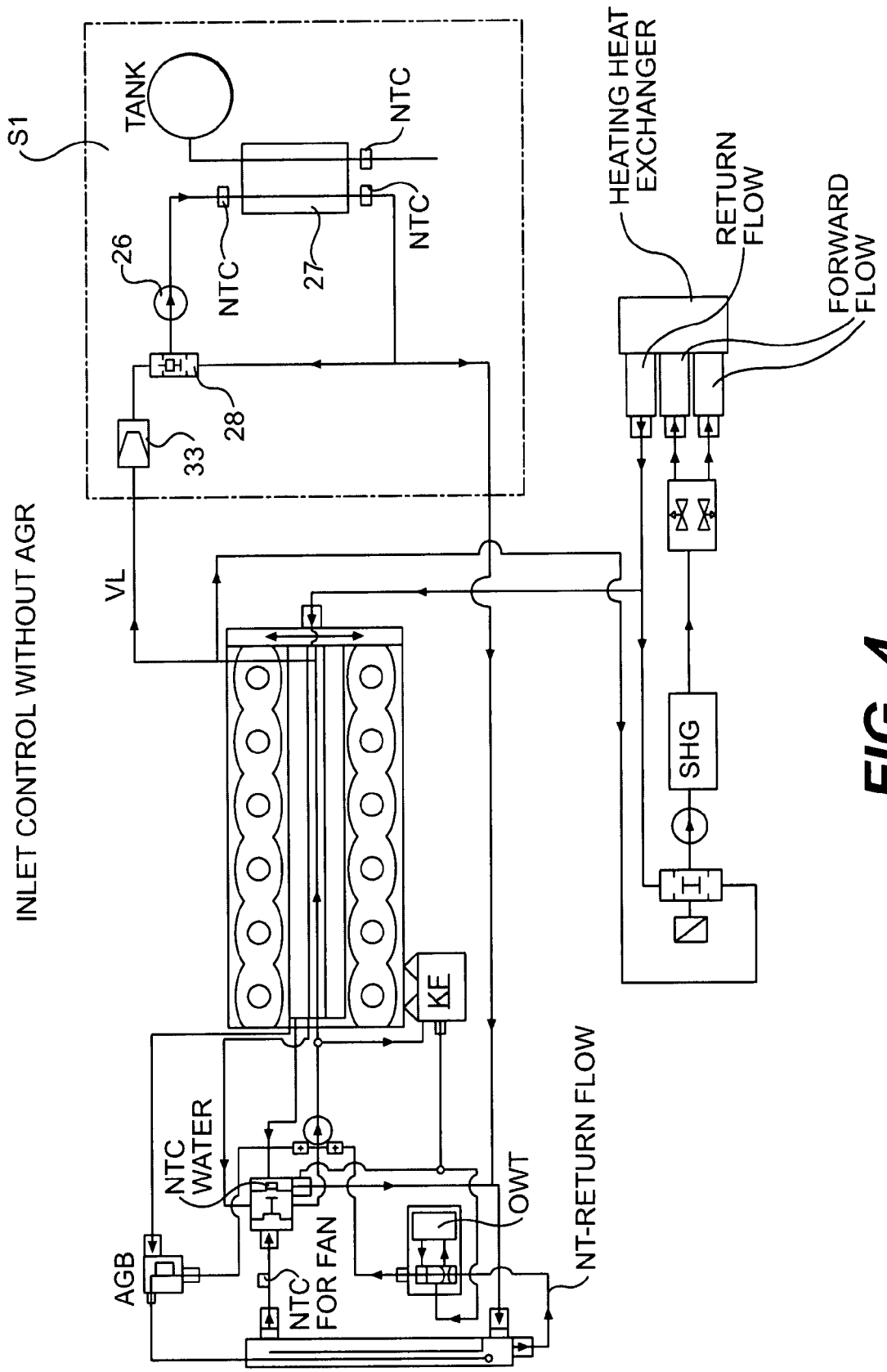
FIG. 4 shows an overall diagram of a circulating system for a heat transfer medium for a liquid-cooled combustion engine with a vaporization system according to FIG. 2c.

FIG. 4 shows an embodiment of the coolant circuit for a motor vehicle having a design of the fuel vaporization system S1 according to FIG. 2c. The statements made regarding FIG. 3 are also applicable here accordingly.

Figure 5:
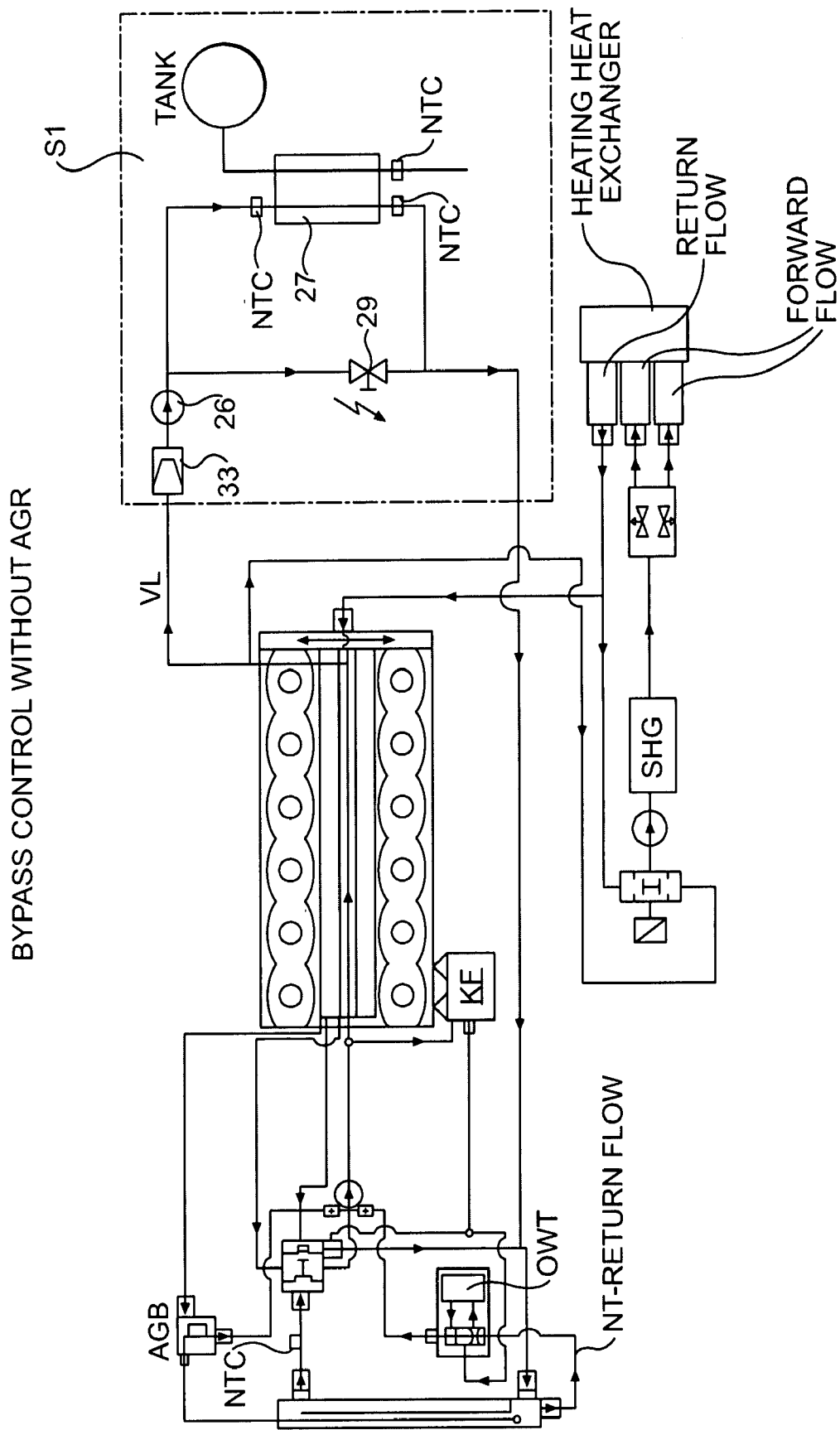
FIG. 5 shows an overall diagram of a circulating system for a heat transfer medium for a liquid-cooled combustion engine with a vaporization system according to FIG. 2d.

FIG. 5 shows an embodiment of the coolant circuit using a vaporization system S1 according to FIG. 2d. Otherwise, the statements regarding FIG. 3 also apply here appropriately.

Figure 6:
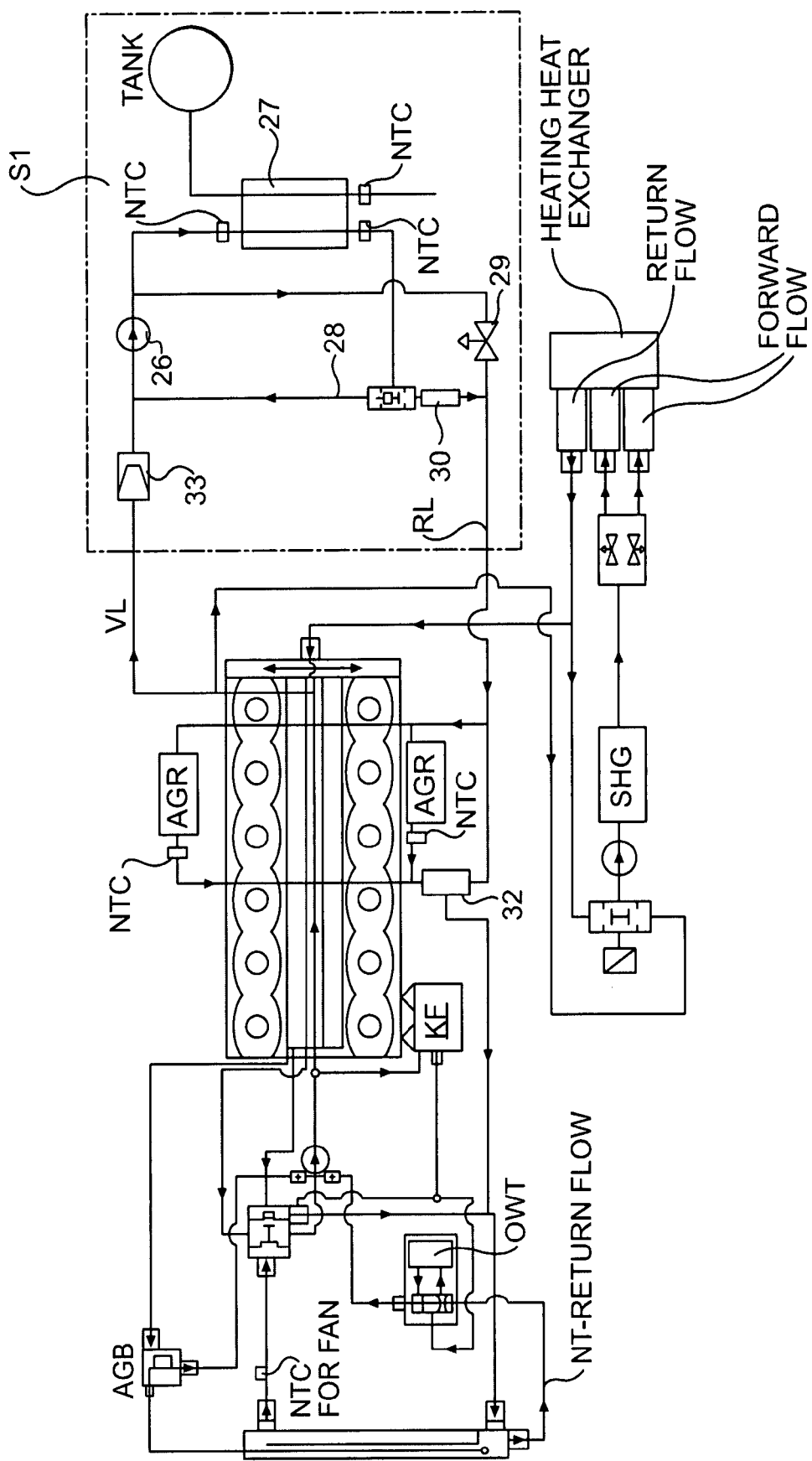
FIG. 6 shows an overall diagram of a circulating system for a heat transfer medium for a liquid-cooled combustion engine with a vaporization system according to FIG. 2b and an exhaust gas recycling system cooled via the return flow section.

FIG. 6 shows an embodiment of the coolant circuit in a hydrogen-operated combustion engine equipped with an exhaust gas recirculation device AGR. The vaporizing system S1 corresponds to the embodiment according to FIG. 2b. Here again, the combustion engine is designed as a V-engine only for the sake of example. Each cylinder bank of the combustion engine is assigned an exhaust gas recirculation system AGR. Each exhaust gas recirculation system comprises a heat exchanger tied into the fluid circuit. The admission of coolant to these heat exchangers is accomplished via the return flow line section RL, tying in a thermostatic valve 32. By use of a control unit (not shown here), it is possible to operate the vaporizing system S1 in such a way that the heat transfer fluid flowing over the return flow line RL has a return flow temperature adjusted to a required coolant effect in the area of the exhaust gas recirculation system.

Figure 7:
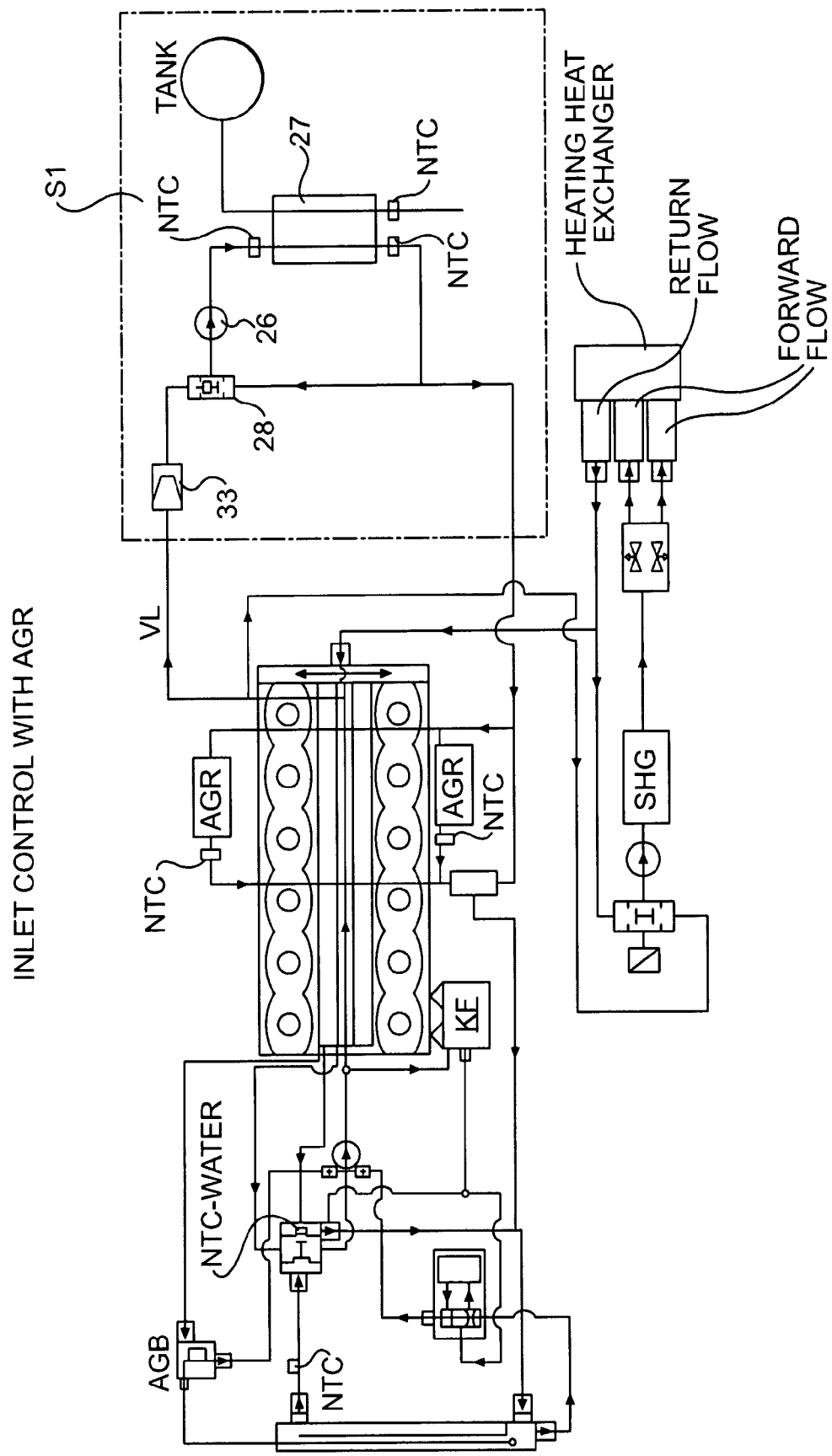
FIG. 7 shows an overall diagram of a circulating system for a heat transfer medium for a liquid-cooled combustion engine with a vaporization system according to FIG. 2c and an exhaust gas recycling system cooled via the return flow section.

FIG. 7 shows an embodiment of the coolant circuit of a combustion engine with an exhaust gas recirculation system tied into the coolant circuit, which is the same as that described above in conjunction with FIG. 6. The design of the fuel vaporizing system S1 corresponds to the variant according to FIG. 2c.

Figure 8:
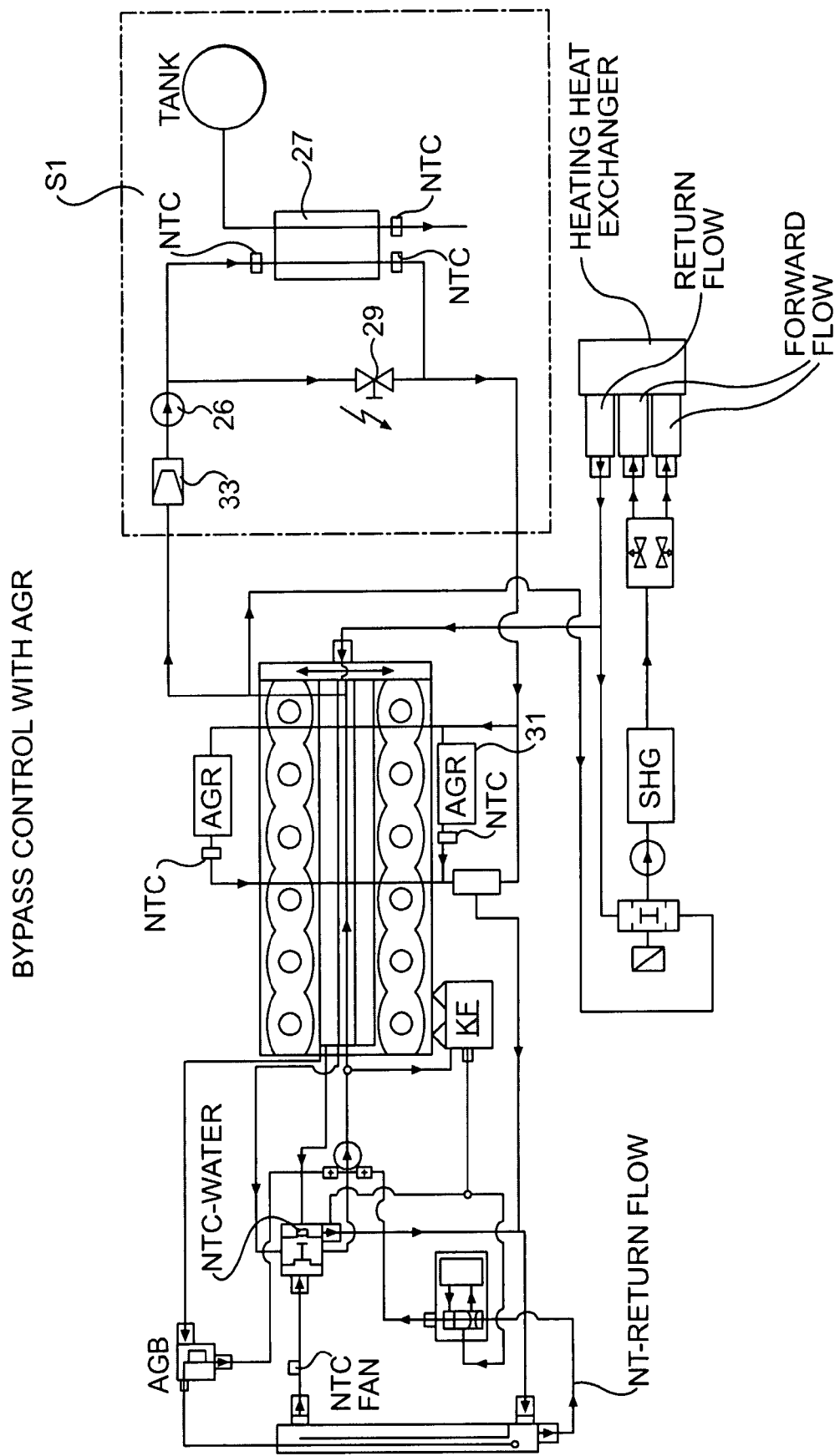
FIG. 8 shows an overall diagram of a circulating system for a heat transfer medium for a liquid-cooled combustion engine with a vaporization system according to FIG. 2d and an exhaust gas recycling system cooled via the return flow section.

FIG. 8 shows another embodiment of the coolant circuit for a water-cooled combustion engine equipped with an exhaust gas recirculation system. The vaporization system S1 corresponds in design to the variant described in conjunction with FIG. 2d. Otherwise, the statements made regarding FIG. 3 and also those made regarding FIGS. 6 and 7 are applicable accordingly.

The inventive systems described above are characterized by high control quality with regard to the $H_2$ temperatures as well as the coolant temperatures. By branching off the forward flow to the $H_2$ heat exchanger from the block area, e.g., the V space of a combustion engine and by tying the return flow into the radiator forward flow, this yields a reduced dependence of the coolant volume flow through the $H_2$ heat exchanger on the engine rotational speed. In addition, high forward flow temperatures may be achieved on the $H_2$ heat exchanger reliably as needed. With the bypass variant described here, high volume flows fed into the cooling-water return flow are taken into account through the control circuit established in conjunction with the main thermostat.

By regulating the $H_2$ temperature via the small circuit on the $H_2$ heat exchanger using a thermostat or an electrically controlled valve, a lower coolant temperature level can be adjusted locally in the $H_2$ heat exchanger than in the remaining cooling circuit. This makes it possible to reduce the otherwise great temperature difference between the fuel, in particular hydrogen, and the coolant on the $H_2$ heat exchanger, which yields advantages with regard to the thermal and mechanical burden on the components of the $H_2$ heat exchanger.

A bypass control and a pump control via the $H_2$ heat exchanger (large volume flows in the return) to the "conventional" cooling circuit are possible as needed.

By using the given AGR radiators, a reduction in NOX is possible. The incoming flow to the AGR radiators may be accomplished with valve control and thermostatic control. The valve serves to increase the volume flow in the $H_2$ heat exchanger return flow (independently of the load case of the $H_2$ heat exchanger). The thermostat serves to improve the heating performance, among other things (reducing consumption, increasing heating power). In the critical cold start case, heat losses via the AGR bypass may be ruled out by heating the AGR radiators (no AGR operation on the exhaust gas end) and the pressure drop in the AGR radiators can be eliminated. This results in a large operating temperature range, in particular in a cold start. When the cooling water is heated in the AGR heat exchanger (AGR operation on the exhaust end) the AGR radiator bypass is closed and all the cooling water is sent through the AGR heat exchanger. The pressure drops in the AGR radiators are low at higher coolant temperatures (change in viscosity). In bypass operation, a small leakage volume flow should flow from the AGR radiators to the control thermostat to transmit the temperature signal to the control element (e.g., a wax element) for the purpose of control.

To protect the $H_2$ heat exchanger, preferably coolant filter 33 is used. If the cross sections of the coolant passage in the $H_2$ heat exchanger are very small, blockage of the $H_2$ heat exchanger may otherwise occur due to contaminants in the coolant circuit (glass fibers). The coolant filter 33 is preferably tied in directly to the system upstream from the $H_2$ heat exchanger.

The regulability of the pump makes it possible to minimize fluctuations in coolant temperatures; this leads to a reduction in $H_2$ temperature differences in partial load and/or full load and relieves the burden on the vehicle's on-board network. By regulating the pump delivery, a coolant inlet temperature control may also be implemented on the $H_2$ heat exchanger in which the coolant outlet temperature on the $H_2$ heat exchanger and thus also the $H_2$ outlet temperature are regulated via the coolant volume flow.

The temperature sensors in the forward and return flow of the $H_2$ heat exchanger may be used to regulate the extra water pump. These sensors may also be used to detect possible ice in the $H_2$ heat exchanger (preventing the risk of prior damage to the $H_2$ heat exchanger) and for limiting the maximum engine power—or for switching to gasoline operation in bivalent operating mode. The corresponding control unit may be configured such that it operates according to an algorithm which performs a plausibility check on the basis of the quantities of heat transferred. This control unit may be implemented by the CE control unit.

The pump provided for delivering the heat transfer fluid through the $H_2$ heat exchanger is preferably designed as a diagnosable electronic pump and adjusted for operation for a clean energy application. The pump may be designed for use of the system in a motor vehicle from the standpoint of a cold start versus the "normal" operating case. Therefore, a large operating temperature range (approx. −25° C. to . . . ) is achieved and an option for an increase in performance (greater engine performance with, at the same time, a higher heating output for the $H_2$ heat exchanger) is created. A reduction in engine power at starting temperatures below −15° C., for example, may also be provided through a corresponding configuration of the control unit.

The pump is preferably triggered via several engine characteristics maps by which the engine rotational speed, the coolant outlet temperature on the $H_2$ heat exchanger, the $H_2$ outlet temperature on the $H_2$ heat exchanger, the coolant temperature difference at the $H_2$ heat exchanger (max. selection via all four engine characteristics maps) and the pump temperature (minimum selection) may be taken into account.

By tying the return flow from the $H_2$ heat exchanger into the radiator forward flow hose, reliable venting can be achieved in an advantageous manner directly into the equalizing tank. It is possible to tie the $H_2$ heat exchanger into the system upstream from the return flow and upstream from the vehicle radiator without any considerable impairment in cooling power.

By separating the heating circuit (with stationary heating) and the $H_2$ heat exchanger circuit, it is possible to greatly increase the heating output. At the same time, in stationary heating operation the maximum possible heating power can be retrieved. A stationary heating operation independently of driving operation would be possible with the tie-in of the $H_2$ heat exchanger as described here.

By tying the return flow from the $H_2$ heat exchanger into the radiator forward flow hose, the pressure in the radiator forward flow hose can also be increased and the flow through the transmission oil heat exchanger can be increased. The transmission oil temperatures are thereby reduced permanently.

The tie-in of the heat exchange system provided for fuel vaporization as described here makes it possible to provide the required quantity of heat without any negative effect on the individual engine cooling, engine oil cooling, transmission oil cooling and heating subsystems.

The inventive vaporizing system is characterized by the advantages listed below, in particular:

High control quality, little alternating temperature performance of the coolant circuit and thus also the temperature of the gas and/or $H_2$; thus load alternations, changes in engine rpm, turning the heating system on and off have little effect on driving performance (constant $H_2$ temperature at full load→constant max. speed);

Reducing the risk of icing and detecting icing in the $H_2$ heat exchanger;

Vehicle electric system load due to the pump adapted to the operating state;

High operating reliability;

Reliable bleeding of the coolant circuit;

High heating performance for vehicle interior (comfort) in driving heating operation and stationary heating operation;

Optimum utilization of cooling capacity of the vehicle radiator;

Reducing the transmission oil temperatures (lower temperature collective leads to longer lifetime);

High variability with regard to regulation of the $H_2$ temperature (regulating thermostat or electric valve, large or small volume flow in forward/return flow to/from the $H_2$ heat exchanger subcircuit possible);

Separation of primary and secondary circuits increases the reliability and safety of the system ($H_2$ does not enter the primary coolant circuit of the vehicle). In addition, when working on the $H_2$ heat exchanger (e.g., replacing it) it is not necessary to drain all the coolant of the coolant circuit and/or bleed the entire coolant circuit. In the secondary circuit, with a suitable choice of materials there is the possibility of working with a higher glycol concentration and thus preventing icing (increasing the operating temperature range for a cold start). The glycol concentration in the $H_2$ heat exchanger can thus be selected regardless of issues pertaining to material releases in the "conventional" coolant circuit;

Tying the $H_2$ heat exchanger into the coolant circuit reduces the quantity of heat to be removed by the vehicle radiator through the refrigerant input at the $H_2$ heat exchanger. In monovalent $H_2$ operation, this permits a reduction in radiator surface area/depth (lower pressure drop in flow through the engine space). Thus the concept of extremely low-temperature storage of $H_2$ while at the same time tying the $H_2$ heat exchanger into the cooling circuit and making appropriate adjustments on the vehicle end (radiator inlet surfaces, . . . ) leads to an improvement in the cx value and thus to a reduction in fuel consumption. In addition to optimization of the cx value, this yields new options for the design and also for the protection of pedestrians.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for vaporizing a cryogenically stored fuel by utilizing heat generated in a vicinity of a fuel consumer, comprising:

a vaporizing device for vaporizing fuel withdrawn from a fuel tank, introducing heat of vaporization;

a gas line device for supplying the vaporized fuel to the consumer;

a heat transfer system provided in the vicinity of the consumer for absorbing heat generated in the vicinity of the consumer; and a fuel-heat exchanger device through which a heat transfer fluid passes, forming part of the vaporizer device for supplying the heat of vaporization through a heat stream withdrawn from the heat transfer system;

wherein the coupling of the fuel-heat exchanger device with the heat transfer system is accomplished via a forward flow section and a return flow section such that the throughput of heat transfer fluid through the fuel-heat exchanger device, as is required for introducing the heat of vaporization, is adjustable in deviation by the fluid throughput through at least one of the forward flow section and the return flow section, independently of the other one.

2. The system as claimed in claim 1, wherein a thermal coupling of the fuel-heat exchanger device with the heat transfer system on the consumer end is accomplished via an intermediate heat exchanger.

3. A system for vaporizing a cryogenically stored fuel by utilizing heat generated in a vicinity of a fuel consumer, comprising:

a vaporizing device for vaporizing fuel withdrawn from a fuel tank, introducing heat of vaporization;

a gas line device for supplying the vaporized fuel to the consumer;

a heat transfer system provided in the vicinity of the consumer for absorbing heat generated in the vicinity of the consumer; and a fuel-heat exchanger device through which a heat transfer fluid passes, forming part of the vaporizer device for supplying the heat of vaporization through a heat stream withdrawn from the heat transfer system;

wherein the coupling of the fuel-heat exchanger device with the heat transfer system is accomplished via a forward flow section and a return flow section such that the throughput of heat transfer fluid through the fuel-heat exchanger device, as is required for introducing the heat of vaporization, is adjustable in deviation by the fluid throughout through at least one of the forward flow section and the return flow section, wherein the coupling of the fuel-heat exchanger device is accomplished with separation of the fluid circuits into one primary circuit of the heat transfer system and at least one secondary circuit coupling the primary circuit to the fuel heat exchanger device.

4. The system as claimed in claim 2, wherein the coupling of the fuel-heat exchanger device is accomplished with separation of the fluid circuits into one primary circuit and at least one secondary circuit.

5. The system as claimed in claim 3, wherein for the separate fluid circuits, different heat transfer of fluids are accommodated in the respective fluid circuits.

6. The system as claimed in claim 4, wherein for the separate fluid circuits, different heat transfer of fluids are accommodated in the respective fluid circuits.

7. The system as claimed in claim 1, wherein the coupling is accomplished with the inclusion of a bridge line which permits partial recycling of a heat transfer fluid stream flowing out of the fuel-heat exchanger device to the input side of the fuel-heat exchanger device.

8. The system as claimed in claim 1, wherein the coupling is accomplished with the inclusion of a bypass line device for creating a fluid connection between the forward flow section and the return flow section, bypassing the fuel-heat exchanger device.

9. The system as claimed in claim 7, wherein the coupling is accomplished with the inclusion of a bypass line device for creating a fluid connection between the forward flow section and the return flow section, bypassing the fuel-heat exchanger device.

10. The system as claimed in claim 1, wherein an input temperature detecting sensor is provided for detecting the input temperature of the heat transfer fluid at the inlet of the fuel-heating device.

11. The system as claimed in claim 1, wherein an output temperature detecting sensor is provided for detecting the output temperature of the heat transfer fluid at the output of the fuel-heat exchanger device.

12. The system as claimed in claim 10, wherein an output temperature detecting sensor is provided for detecting the output temperature of the heat transfer fluid at the output of the fuel-heat exchanger device.

13. The system as claimed in claim 1, wherein a pump device is provided for conveying the heat transfer fluid through the fuel-heat exchanger system.

14. The system as claimed in claim 1, wherein final controlling valves are provided for adjusting flow-through conditions through the fuel-heat exchanger device.

15. The system as claimed in claim 9, wherein actuator valves are provided for adjusting flow-through conditions through the bypass line or the bridge line.

16. The system as claimed in claim 1, wherein a control unit is provided for adjusting the fluid throughput through the forward flow and return flow sections and/or through the fuel-heat exchanger device so as to result in system settings tailored to an instantaneous operating state of the consumer.

17. The system as claimed in claim 1, wherein the fuel-heat exchanger device is operated such that a cooling potential is made available for the consumer, which consumer comprises at least one of:
an engine, an exhaust gas recirculation system, a charging air cooling system, a vehicle air-conditioning system, and transmission systems, through the heat transfer fluid stream flowing out on an output end of the heat exchanger device.

18. The system as claimed in claim 1, wherein the heat transfer fluid is withdrawn from an area of the consumer which makes available a sufficiently high temperature potential for applying a vaporization capacity through the fuel-heat exchanger device.

19. The system as claimed in claim 18, wherein the heat transfer fluid is withdrawn from a fast-heating and/or high-temperature section of the heat transfer system on the consumer end.

20. The system as claimed in claim 1, wherein the heat transfer fluid stream cooled by heat withdrawn from the fuel-heat exchanger device is fed into a cooling fluid stream upstream from a cooling-water heat exchanger.

21. The system as claimed in claim 1, wherein the consumer is a combustion engine.

22. The system as claimed in claim 1, wherein the consumer is a fuel cell.

23. The system as claimed in claim 1, wherein the heat transfer system forms a coolant circuit of the consumer.

24. The system as claimed in claim 1, wherein the heat transfer system cooperates with an exhaust gas recirculation system.

25. The system as claimed in claim 1, wherein a waste heat system comprises a lubricant system of the consumer or drive train components.

26. The system as claimed in claim 1, wherein the heat transfer takes places in the fuel-heat exchanger device selectively according to the co-current or counter-current principle.

27. The system as claimed in claim 1, wherein the fuel is at least temporarily in a liquid state when entering the heat exchanger.

28. The system as claimed in claim 1, wherein hydrogen is used as the fuel.

29. The system as claimed in claim 1, wherein the fuel stored in a tank has a temperature of less than 150 K.

30. A method for vaporizing a cryogenically stored fuel, the method comprising the acts of:
withdrawing the fuel from a tank device;
heating and vaporizing the fuel via a vaporizer device designed as a heat exchanger, wherein a heat stream required for continuous vaporization of the fuel is withdrawn via a thermally regulated heat transfer fluid stream which is withdrawn from a heat transfer system provided on the consumer end; and
adjusting the fluid stream withdrawn from the heat transfer fluid system on the consumer end and a vaporizer fluid stream passed through the vaporizer device to various levels in at least some phases as a function of the operating state of the consumer, by adjusting a forward flow independently of a return flow of the heat transfer system.

31. The method as claimed in claim 30, wherein the fluid streams are adjusted with the provision that a quantity of heat required for supplying gaseous hydrogen is to be made available in the range of preselected temperature gradients.

32. The method as claimed in claim 30, wherein the fluid streams are adjusted with the provision that the quantity of heat required for supplying the fuel is to be made available at a preselected inlet temperature of the vaporizer fluid stream.

33. The method as claimed in claim 30, wherein the fluid streams are adjusted with the provision that the quantity of heat required for supplying the fuel is to be made available on reaching a preselected outlet temperature of the vaporizer fluid stream.

34. The system as claimed in claim 28, wherein the fuel is stored in a tank at a temperature of less than about 20 K.

35. The method as claimed in claim 30, wherein the fuel comprises gaseous hydrogen.

* * * * *